Jan. 8, 1963  G. E. BECK  3,072,900
DOPPLER RADAR SYSTEMS
Filed July 31, 1958

INVENTOR:
Geoffrey Edward Beck
BY:
Baldwin & Wight
ATTORNEYS

United States Patent Office 3,072,900
Patented Jan. 8, 1963

3,072,900
DOPPLER RADAR SYSTEMS
Geoffrey Edward Beck, Billericay, England, assignor to Marconi's Wireless Telegraph Company Limited, London, England, a company of Great Britain
Filed July 31, 1958, Ser. No. 752,319
Claims priority, application Great Britain Sept. 3, 1957
9 Claims. (Cl. 343—8)

This invention relates to Doppler radar systems, that is to say to radar systems in which information as respects a target which is moving in relation to the system is derived by ascertaining the shift of frequency which occurs between the transmitted frequency and the received echo signal frequency as a result of the relative movement. Though not limited to its application thereto, the invention is particularly intended for and of great advantage in Doppler radar systems used for radio speed or drift indicators on aircraft. In such systems, as is well known, the speed of the aircraft in relation to the earth's surface is ascertained by measuring the Doppler frequency shift which occurs between a transmitted frequency and the frequency of echo signals reflected back from the earth's surface due to the movement of the aircraft in relation to that surface.

The invention is illustrated in and further explained in connection with the accompanying drawings in which.

Figures 1, 2, 3:
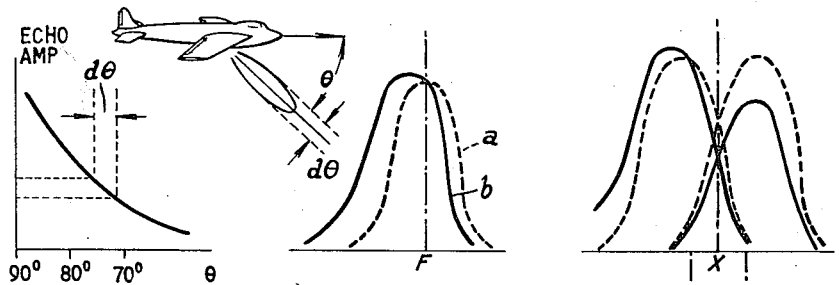
FIGS. 1, 2 and 3 are explanatory graphical curve diagrams.

A serious defect which occurs in known Doppler radar systems for aircraft speed or drift indication and which may occur in other Doppler radar systems is that the apparent Doppler shift is not independent of the nature of the radio reflecting surface. In an aircraft radio speed or drift indicator this defect causes what may be termed terrain error and results in speed readings which differ with the nature and condition of the land or sea over which the aircraft is flying. It arises as a result of the facts that a transmitted radio beam cannot be a mere ray but must be a finite width and the amplitude of a reflected echo signal depends inter alia on the incidence angle with which a transmitted beam strikes a reflecting surface and also on the form and nature of that surface. FIG. 1 illustrates graphically the relation between echo signal amplitude and angle of incidence of the transmitted beam. In FIG. 1 the ordinates are arbitrary values of echo signal amplitude and the abscissae are values of the angle $\theta$ between an incident ray and the horizontal. This angle $\theta$ is represented for the central ray of a beam transmitted from an aircraft in the representation shown between FIGS. 1 and 2 in which it is presumed that the aircraft is flying horizontally, i.e. parallel to the earth's surface below it. From FIG. 1 it will be seen that maximum echo signal is obtained when the transmitted beam strikes the earth normally, falling away in some such manner as indicated by the full line curve of FIG. 1 as the angle to the normal increases. Since the transmitted beam is necessarily of finite width $d\theta$, the reflected signal amplitude will be different for different parts of the beam as is indicated by the portion $d\theta$ of the full line curve of FIG. 1. The effect of this is to produce, as is shown in FIG. 2, a shift and a distortion of the echo Doppler frequency spectrum. Instead of this spectrum being representable by a symmetrical curve $a$, as in the broken line curve of FIG. 2, centered on and symmetrical about a true central Doppler frequency F, i.e. the Doppler frequency which would be obtained if, instead of a beam of finite size, it was possible to transmit and receive back only the central ray of that beam, there is obtained a spectrum more or less as represented by the full line curve $b$ of FIG. 2. As will be seen the curve of this spectrum is no longer symmetrical and it is also shifted along the frequency scale with respect to the "ideal" curve $a$. The amount of shift and asymmetry obtained in any particular case and for any particular mean angle of incidence of the beam is dependent upon the nature of the reflecting surface being at a minimum for very rough ground and a maximum for a very smooth surface such as a calm sea. Accordingly errors due to the phenomenon may not only be serious but will in general be unknown and such as cannot be compensated for.

The object of the present invention is to provide improved Doppler radar systems in which errors due to the above described phenomenon will be very greatly reduced if not altogether eliminated. A particularly important object of the invention is to provide improved aircraft speed or drift indicating Doppler radars in which terrain error is eliminated or much reduced.

The principle of the present invention resides in transmitting two directional radio beams at a small angle to one another so that there will be two overlapping resultant echo signal Doppler spectra and deriving required Doppler frequency information not by measuring the peak amplitude frequency of a Doppler spectrum or the limiting frequencies of such a spectrum, but by measuring that frequency in which the signal amplitude is the same for both spectra. This principle is illustrated graphically in FIG. 3 in which the two overlapping broken line curves are "ideal" curves representing Doppler spectra corresponding to echo signals produced by two beams transmitted at a small angle to one another and the full line curves are curves such as might be obtained in actual practice. In accordance with this invention the required Doppler frequency information is obtained by measuring the frequency X where the two curves cross, i.e. where both are of the same amplitude. The angle between the two transmitted directional beams is not critical but in practice it may be of 3° or 4° or thereabouts. It will be appreciated that it is not necessary either to transmit the two beams simultaneously or to receive the resulting echo signals simultaneously since time sharing may be resorted to as regards either transmission or reception, i.e. the two beams may be transmitted alternately at a suitably rapid rate and/or the echo signals may be received alternately at such a rate. It will be evident from FIG. 2 that terrain error is much reduced if not entirely eliminated for, although change in the nature of the terrain will alter the positions and shapes of the two spectra, it will not produce any serious or first order shift in the value of the common amplitude frequency.

According to a feature of this invention a Doppler radar system includes means for transmitting two directional radio beams at a predetermined small angle to one another, means for receiving resultant echo signals, means for deriving a Doppler band of frequencies present in the echo signals due to one beam when said beam encounters a relatively moving target, means for deriving an overlapping Doppler band of frequencies present in the echo signals due to the other beam when said other beam encounters said target, and means for ascertaining that frequency at which the echo signal amplitude is the same in both bands.

According to another feature of this invention a Doppler radar system includes means for transmitting two directional radio beams at a predetermined small angle to one another, means for receiving resultant echo signals, means for deriving a Doppler band of frequencies present in the echo signals due to one beam when said beam encounters a relatively moving target, means for deriving an overlapping Doppler band of frequencies present in the echo signals due to the other beam when said other beam encounters said target, means for mixing each of the derived bands with a variable local frequency, means for comparing the amplitudes of the two resultants of mixing, means responsive to the resultant of amplitude comparison for varying said local frequency to restore and maintain substantial equality between the compared amplitudes and means for ascertaining the instantaneous value of said local frequency.

Preferably the two Doppler bands are mixed with a local frequency which is variable over the expected range of Doppler frequencies, derived signals resulting from said mixing are subjected to filtering by a narrow band pass filter and the filtered resultants are compared in amplitude by an amplitude comparator connected to control the local frequency. In preferred practice the said derived signals resulting from mixing are fed to phase sensitive rectification means followed by a low pass filter which may have a pass range of, for example 0–150 c./s.

The local frequency may conveniently be generated by a generator driven by a motor whose speed is controlled in dependence upon the result of amplitude comparison.

Separate echo signal receivers may be employed for the echo signals resulting from the two transmitted beams and signals derived from the two overlapping Doppler bands may be amplitude compared simultaneously to ascertain the frequency of common amplitude. Alternatively a common receiver may be employed and alternately connected to receive echo signals resulting from the two transmitted beams, the two overlapping Doppler bands thus alternately obtained being fed in turn to the amplitude comparing means.

The required small angle between the transmitted beams may be obtained in any convenient way known per se, e.g. differently directed aerials may be used, or, if aerials of the slotted waveguide types are employed, their slots may be cut differently so as to provide the required angular relationship, or, again, where aerials of the slotted waveguide type are employed they may be similar, but fed with different transmitted frequencies so as to produce differently angled beams. It is even possible to use a common transmitting aerial and two different transmitted frequencies so that the two differently directed transmitted beams are obtained either simultaneously or in turn. Again common transmit-receive aerials may be used or separate aerials may be employed for transmission and reception. These and other variations form per se no part of this invention and being known per se need not be described herein.

Figure 4:
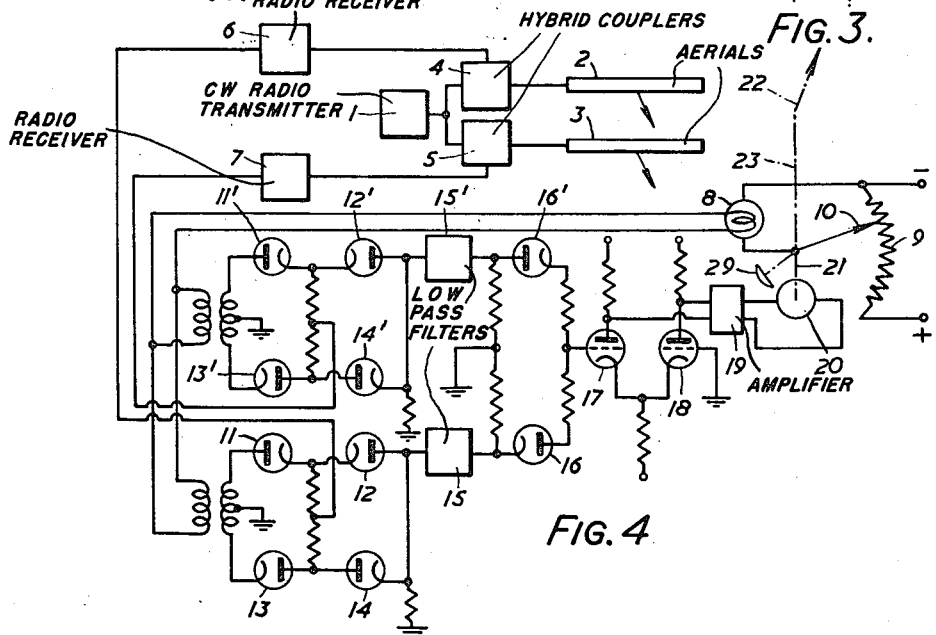
FIGS. 4 and 5 are simplified diagrams of two embodiments of the present invention.

Referring now to FIG. 4 which shows one embodiment of the invention as applied to an aircraft speed indicator, block 1 represents a continuous wave radio transmitter which feeds two aerials 2 and 3 which may be, for example, of the slotted waveguide type. The aerials are arranged to transmit in different directions at a small angle to one another, for example aerial 2 may transmit downwards at an angle of, say, 63° to the horizontal and aerial 3 may transmit downwards at an angle of, say, 67° to the horizontal. In the particular embodiment now being described it is assumed that the aerials both operate on the same frequency, though, as already stated, this is not necessary. The aerials are fed through suitable known hybrid couplers 4 and 5 to enable the said aerials to be used for both transmission and reception and to provide coupling in the transmitting direction from the transmitter 1 to the aerials 2 and 3, and in the receiving direction from the aerials 2 and 3 to separate receivers 6 and 7. The outputs of the two receivers are mixed with a locally generated frequency derived from a generator 8 which may be and is schematically represented as a phonic wheel generator, i.e. a generator consisting of an electric motor driving a toothed iron wheel, the teeth of which pass through the magnetic circuit of an inductive pick-up device. The speed of the electric motor and therefore the frequency generated is controlled by a potentiometer 9, the moving contact 10 of which is automatically controlled as will hereinafter be described. The generator 8 is designed to be varied over a range of frequencies determined by the range of expected Doppler frequencies. As will be seen, output from the receiver 6 is mixed with the frequency from the generator 8 in a balanced mixer and phase sensitive rectifier of known form and comprising diodes 11, 12, 13 and 14, while the output from receiver 7 is similarly mixed with the output from the generator 8 and rectified in a similar circuit comprising diodes 11′, 12′, 13′ and 14′. The resultant outputs are fed through low pass filters 15 and 15′ which may have a pass range of 0 to 150 c./s. to quote a practical figure. As will be appreciated this pass range need only be wide enough to accommodate a narrow band of width equal to that of a band (such as the band x of FIG. 3) in which the frequency X occurs and which is wide enough to enable that frequency to be reliably and conveniently formed.

The filtered outputs from 15 and 15′ are passed through diodes 16 and 16′ to a known amplitude comparator comprising two valves 17 and 18 connected as a long tailed pair. The differential output taken from between the anodes of these two valves is suitably amplified in an amplifier 19 and used to drive an electric motor 20 which drives the pointer 10 of the potentiometer 9—10 as indicated by the chain line 21. As will be seen if the outputs from diodes 16 and 16′ are exactly equal, there will be no input to the motor 20, but if either predominates in amplitude, the motor 20 will run in one or other direction (depending upon which predominates) and will shift the slider 10 which in turn alters the frequency of the generator 8 until that frequency again results in equality of the two inputs to the amplitude comparator. Accordingly the frequency X can be measured in terms of the frequency from generator 8, e.g. by measuring that frequency or the speed of the motor incorporated in generator 8, or by observing the position of the slider 10. In FIG. 4 a pointer 22, mechanically linked with the slider 10 as indicated by the chain line 23, represents one way of indicating the frequency X.

It will be noted that, in the apparatus as so far described, input to the motor 20 disappears not only when the frequency from the generator 8 corresponds to the frequency X but also when the frequency from the generator 8 lies outside the total range of frequency covered by both spectra in FIG. 2. In practice, therefore, it is necessary to provide for coarse adjustment of the slider 10 to bring it to a point from which the apparatus illustrated can take control. This coarse adjustment may be effected automatically or manually. In FIG. 4, for the sake of simplicity, manual adjustment is indicated by a knob 29 which can drive the pointer 10 but it is preferred to provide automatic coarse adjustment. Such coarse adjustment can obviously be effected by any convenient known servo system arranged to follow the average Doppler frequency produced.

Figure 5:
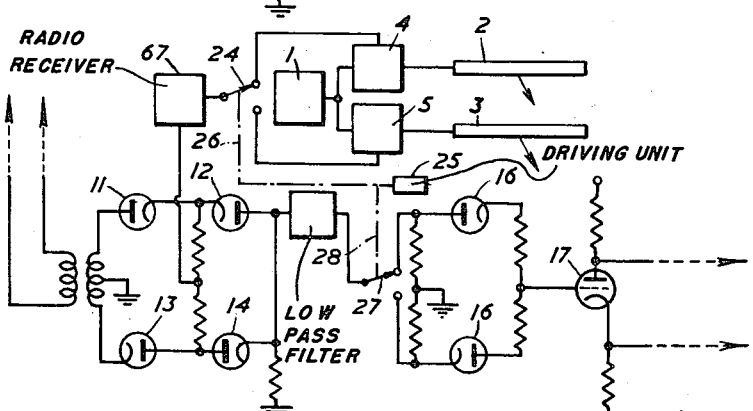

The modification partly shown in FIG. 5 differs from that of FIG. 4 only in that instead of using two receivers, there is a single receiver which is employed with time sharing switching. Like references denote like parts in both figures.

In FIG. 5 the common receiver 67 is alternately connected at a suitably rapid rate to the two hybrid couplers 4 and 5 through any convenient means schematically represented by a switch 24 driven by a driving unit 25 as indicated by the chain line 26. The output from the common receiver 67 is mixed in a mixing and rectifying circuit, corresponding to one of those in FIG. 4, comprising diodes 11, 12, 13 and 14, with the output from the phonic wheel generator 8 (not shown in FIG. 5) and the resultant is passed through a low pass filter 15 as before. The filtered output is fed alternately to the diodes 16 and 16′ by means of a switch 27 ganged with the switch 24 as indicated by the chain line 28. The diodes 16 and 16' thus alternately feed into the amplitude comparator (only one valve of which is shown in FIG. 5) which effects control of the phonic wheel generator as in FIG. 4.

I claim:
1. A Doppler radar system including means for transmitting two directional radio beams at a predetermined small angle to one another, means for receiving resultant echo signals, means for deriving a Doppler band of frequencies present in the echo signals due to one beam when said beam encounters a relatively moving target, means for deriving an overlapping Doppler band of frequencies present in the echo signals due to the other beam when said other beam encounters said target, means for mixing each of the derived bands with a variable local frequency, amplitude comparing means for comparing the amplitudes of the two resultants of mixing, means responsive to the resultant of amplitude comparison for varying said local frequency to restore and maintain substantial equality between the compared amplitudes and means for ascertaining the instantaneous value of said local frequency.

2. A Doppler radar system as set forth in claim 1 wherein the local frequency is generated by a generator driven by a motor whose speed is controlled in dependence upon the result of amplitude comparison in said means for comparing the amplitudes of the two resultants of mixing.

3. A Doppler radar system as set forth in claim 1 wherein the two Doppler bands are mixed with a local frequency which is variable over the expected range of Doppler frequencies, and wherein the derived signals resulting from said mixing are subjected to filtering by a narrow band pass filter and wherein the filtered resultants are compared in amplitude by said amplitude comparing means connected to control the local frequency.

4. A Doppler radar system for aircraft comprising means on said craft for transmitting towards the earth's surface two directional radio beams at a predetermined small angle to one another, means on said craft for receiving resultant echo signals reflected from the earth's surface, means coupled to said last-mentioned means for deriving a Doppler band of frequencies present in the echo signal due to one beam when said beam is reflected from the earth's surface, means coupled to said receiving means for deriving an overlapping Doppler band of frequencies present in the echo signals due to the other beam when said other beam is reflected from the earth's surface, means for comparing the amplitudes of the two Doppler bands, means for measuring the frequency at which the echo signal amplitudes are the same, means coupled to said means for deriving Doppler bands of frequencies in the echo signals due to each of said beams for deriving a control voltage dependent upon the relative amplitude of the output of said two Doppler bands of frequencies, means for utilizing said control voltage for restoring and maintaining substantial equality between the compared amplitudes in said amplitude comparing means, and means for ascertaining that frequency at which the echo signal amplitude is the same in both bands.

5. A Doppler radar system as set forth in claim 4 wherein the two Doppler bands are mixed with a local frequency which is variable over the expected range of Doppler frequencies, and wherein the derived signals resulting from said mixing are subjected to filtering by a narrow band pass filter and wherein the filtered resultants are compared in amplitude by said amplitude comparing means connected to control the local frequency.

6. A Doppler radar system as set forth in claim 4, wherein the two Doppler bands are mixed with a local frequency which is variable over the expected range of Doppler frequencies, and wherein the derived signals resulting from said mixing are subjected to filtering by a narrow band pass filter and wherein the filtered resultants are compared in amplitude by said amplitude comparing means connected to control the local frequency, and wherein the derived signals resulting from mixing are fed to phase sensitive rectification means followed by a low pass filter.

7. A Doppler radar system as set forth in claim 4 wherein the means on the craft for receiving resultant echo signals reflected from the earth's surface are separate echo signal receivers for receiving the echo signals resulting from the two transmitted beams and wherein the signals derived from the two overlapping Doppler bands are amplitude compared simultaneously to ascertain the frequency of common amplitude.

8. A Doppler radar system as set forth in claim 4 wherein the means on the craft for receiving resultant echo signals reflected from the earth's surface is a common receiver for receiving both sets of echo signals and means for alternately connecting said common receiver with said means for receiving said resultant echo signals reflected from the earth's surface to receive echo signals resulting from the two transmitted beams, the two overlapping Doppler bands thus alternately obtained being fed in turn to the amplitude comparing means.

9. A Doppler radar system for aircraft, comprising means on an aircraft for transmitting two beams of radio energy disposed at angles relative to each other, receiver means on the aircraft for receiving resultant echo signals, means coupled to said last mentioned means for deriving two respective overlapping Doppler bands of frequencies present in the received echo signals due to two beams received at a small angle to one another, and means coupled to said last mentioned means for measuring the frequency at which the echo signal amplitude is the same in both bands.

References Cited in the file of this patent
UNITED STATES PATENTS
2,855,590    Gray ------------------ Oct. 7, 1958